(12) United States Patent
Hirano

(10) Patent No.: US 11,995,817 B2
(45) Date of Patent: May 28, 2024

(54) DEFECT INSPECTION METHOD

(71) Applicant: NuFlare Technology, Inc., Yokohama (JP)

(72) Inventor: Ryoichi Hirano, Tokyo (JP)

(73) Assignee: NuFlare Technology, Inc., Yokohama (JP)

( * ) Notice: Subject to any disclaimer, the term of this patent is extended or adjusted under 35 U.S.C. 154(b) by 189 days.

(21) Appl. No.: 17/643,682

(22) Filed: Dec. 10, 2021

(65) Prior Publication Data

US 2022/0215524 A1 Jul. 7, 2022

(30) Foreign Application Priority Data

Jan. 5, 2021 (JP) ................................ 2021-000536

(51) Int. Cl.
*G06T 7/00* (2017.01)
*G01N 21/88* (2006.01)
*G06V 10/75* (2022.01)

(52) U.S. Cl.
CPC ......... *G06T 7/001* (2013.01); *G01N 21/8806* (2013.01); *G06V 10/751* (2022.01)

(58) Field of Classification Search
CPC ........... G06T 7/001; G06T 2207/30148; G06T 7/0004; G01N 21/8806; G01N 2021/95615; G01N 21/956; G01N 2021/95676; G01N 21/9505; G01N 21/01; G01N 2021/0112; G01N 21/95607; G01N 21/8851; G01N 2021/8854; G06V 10/751; G06V 10/25
See application file for complete search history.

(56) References Cited

U.S. PATENT DOCUMENTS 9,922,415 B2 * 3/2018 Inoue ............... G01N 21/95607
2007/0156379 A1 7/2007 Kulkarni et al.
(Continued)

FOREIGN PATENT DOCUMENTS

JP   2010-96690 A   4/2010
JP   2013-238606 A  11/2013
(Continued)

OTHER PUBLICATIONS

Mann et al., "Improving reticle defect disposition via fully automated lithography simulation", Proceedings vol. 9778, Metrology, Inspection and Process Control for Microlithography XXX;97783U, (2016), 9 pages
(Continued)

*Primary Examiner* — Roy M Punnoose
(74) *Attorney, Agent, or Firm* — Oblon, McClelland, Maier & Neustadt, L.L.P.

(57) ABSTRACT

According to an embodiment, a defect inspection method is performed with a defect inspection apparatus. The defect inspection apparatus is adapted to irradiate a first sample with illumination light to acquire a first sample image, and compare the first sample image to a reference image to inspect a defect. The defect inspection method includes generating the reference image, acquiring the first sample image, setting a defect detection condition using an index based on a result of defect inspection of a second sample different from the first sample, and discriminating a nuisance from a result of comparison between the reference image and the first sample image based on the defect detection condition.

12 Claims, 9 Drawing Sheets

(56) References Cited

U.S. PATENT DOCUMENTS

| | | | |
|---|---|---|---|
| 2007/0288219 A1 | 12/2007 | Zafar et al. | |
| 2010/0098322 A1 | 4/2010 | Inoue et al. | |
| 2011/0188734 A1* | 8/2011 | Tsuchiya | G03F 1/84 382/149 |
| 2012/0140060 A1* | 6/2012 | Tsuchiya | G01N 21/95607 348/126 |
| 2013/0216120 A1* | 8/2013 | Inoue | G06T 7/0004 382/144 |
| 2014/0307945 A1* | 10/2014 | Yasui | G06T 7/60 382/149 |
| 2016/0018340 A1 | 1/2016 | Otani et al. | |
| 2016/0163035 A1 | 6/2016 | Chang et al. | |
| 2016/0292839 A1* | 10/2016 | Inoue | G01N 21/95607 |

FOREIGN PATENT DOCUMENTS

| | | |
|---|---|---|
| JP | 2016-20867 A | 2/2016 |
| JP | 5965467 B2 | 8/2016 |
| JP | 2018-506168 A | 3/2018 |
| KR | 4644210 B2 | 3/2011 |
| KR | 10-2015-0028415 | 3/2015 |
| KR | 10-2015-0086302 | 7/2015 |
| KR | 10-2017-0042337 | 4/2017 |

OTHER PUBLICATIONS

Korean Office Action dated Dec. 6, 2023, issued in Korean Patent Application No. 10-2021-0192096 (with English translation).

* cited by examiner

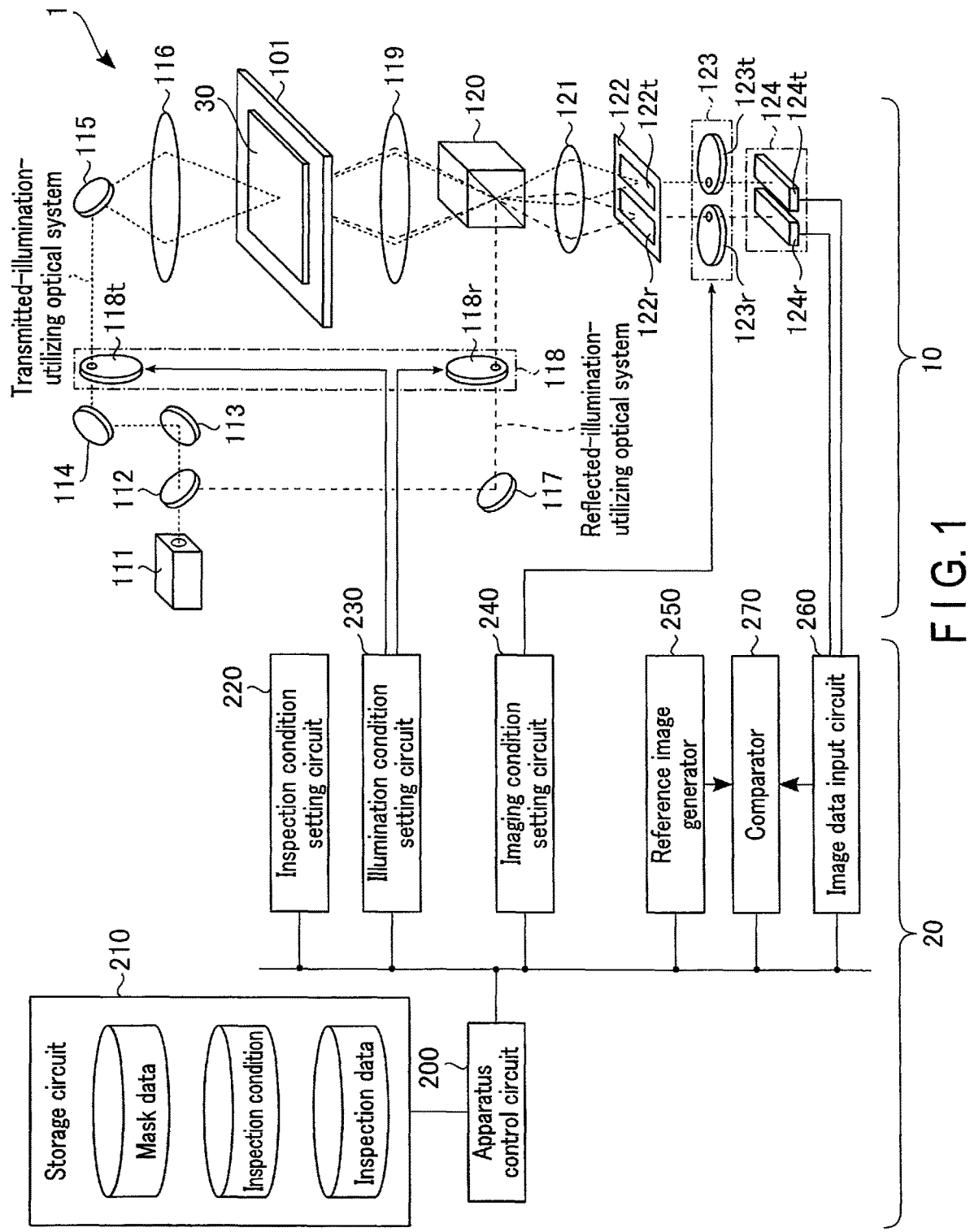
F I G. 1

DEFECT INSPECTION METHOD

CROSS-REFERENCE TO RELATED APPLICATIONS

This application is based upon and claims the benefit of priority from Japanese Patent Application No. 2021-000536, filed Jan. 5, 2021, the entire contents of which are incorporated herein by reference.

FIELD

Embodiments described herein relate generally to a defect inspection method for samples with patterns.

BACKGROUND

The process of manufacturing a semiconductor device includes a step where exposure equipment (also called a "stepper" or a "scanner") performs reduced exposure to transfer circuit patterns onto a semiconductor substrate. The exposure equipment uses a mask (also called a "reticle") with an original pattern (also called a "mask pattern") for the transfer of a circuit pattern onto a semiconductor substrate (also called a "wafer").

One of the causes of yield degradation in a semiconductor device manufacturing process is a defective mask. The presence of an error, a formation defect, or the like in the mask pattern can lead to a failure of formation of the circuit pattern in all of the chips subjected to the exposure operation performed with the mask. Mask patterns are now becoming more miniaturized and diversified as the sizes of the semiconductor devices are reduced. Accordingly, a high defect detection capability is required of a defect inspection apparatus of masks.

Such a defect inspection apparatus has functions of observing a mask under various optical-system conditions and subjecting the acquired images to computational processing so that an enhanced sensitivity and a high throughput are attained. There are modes of inspection including a "die to database (D-DB)" mode where an image expected to be obtained from the design pattern by the inspection apparatus is generated through computations and compared to the acquired image, and a "die to die (D-D)" mode where multiple regions of a mask that have the same pattern are compared to one another.

Defects detected by the defect inspection apparatus will be categorized into, in broad terms, a defect that a user desires to detect (also called a "defect of interest (DOI)") and noise (also called a "nuisance"). Examples of a DOI include a pattern defect and a particle that would affect the yields of semiconductor devices. Examples of a nuisance include a pseudo-defect which is not a defect per se but is detected due to a misalignment between reference image data and actual image data, etc., and a subtle pattern defect or minute particle that would not affect the yields of semiconductor devices.

For example, Jpn. Pat. Appln. KOKAI Publication No. 2016-020867 discloses a high-sensitive defect observation method which discriminates between a defect and noise and obtains their coordinates based on multiple signals (optical images) acquired by the irradiation of a sample using different optical-system conditions. Also, JP Patent No. 5965467 discloses a method in which a defect is categorized using one or more attributes of a mask pattern adjacent to the position of the defect, and a nuisance is thereby removed. However, noise (a nuisance) specified by these inspection methods may not be the nuisance that a user desires to discriminate. In the defect inspection of masks, acquired results are handled differently depending on the purpose.

The criteria for discriminating between a DOI and a nuisance as desired by the user may reflect factors such as the purpose of inspection (e.g., inspection of masks for shipment, inspection of masks for quality control, improvement of yields of semiconductor devices, etc.), the specs of semiconductor devices, and the performance of each process (e.g., lithography, dry etching, etc.) in the manufacturing line for semiconductor devices. As such, depending on the user, different discrimination criteria may be set for the same mask.

Defects detected by the defect inspection apparatus are subjected to a review by reviewing equipment that employs, for example, a scanning electron microscope (SEM) so that a DOI and a nuisance are discriminated from one another in concordance with the user's desire. That is, whether the conditions for detecting a DOI and a nuisance at the defect inspection apparatus are appropriate or not for the user's desired DOI/nuisance discrimination criteria is determined based on the review results. Thus, if many defects which will be specified as nuisances are detected at the defect inspection apparatus, a processing load of review will increase.

For example, supposing that the defect inspection apparatus is set with, according to its capability, optical-system conditions that maximize its defect detection sensitivity and is operated to detect all the detectable defects, the number of defects that will be detected as nuisances increases, and the processing load of the review for discriminating between DOIs and nuisances could increase. To address this, if the defect inspection apparatus is set with a defect detection condition that reflects the user's desired discrimination criteria, it will be possible to keep the number of nuisances picked up in the detection as low as the number for which the review can be done (e.g., 1000 or less) while the optical-system conditions that maximize the defect detection sensitivity are set.

SUMMARY

The objects of the invention include providing a defect inspection method which enables setting of defect detection conditions for a defect inspection apparatus to reduce the ratio of nuisances to DOIs while utilizing the maximum defect detection sensitivity.

According to one embodiment of the invention, a defect inspection method is performed with a defect inspection apparatus. The defect inspection apparatus is adapted to irradiate a first sample with illumination light to acquire a first sample image, and compare the first sample image to a reference image to inspect a defect. The defect inspection method includes generating the reference image, acquiring the first sample image, setting a defect detection condition using an index based on a result of defect inspection of a second sample different from the first sample, and discriminating a nuisance from a result of comparison between the reference image and the first sample image based on the defect detection condition.

According to one embodiment of the invention, it is preferable that the reference image is generated based on design data for the first sample.

According to one embodiment of the invention, it is preferable that the reference image is generated for a region different from a region for which the first sample image is acquired.

According to one embodiment of the invention, it is preferable that the index is prepared based on the result of the defect inspection of the second sample and a prediction of yields which is based on design data for the first sample.

According to one embodiment of the invention, it is preferable that the defect inspection of the second sample uses a defect detection condition set based on design data for the first sample.

According to one embodiment of the invention, it is preferable that the index is set based on the result of the defect inspection of the second sample and information on manufacturing capability for a product which is based on the second sample.

According to one embodiment of the invention, it is preferable that the setting the defect detection condition includes conducting defect detection of a third sample different from the first sample and the second sample and predicting yields based on a result of the defect inspection of the third sample.

According to one embodiment of the invention, it is preferable that the defect detection condition includes multiple elements including defect categorization, defect grouping, defect detection sensitivity, and nuisance filtering.

According to one embodiment of the invention, it is preferable that the multiple elements are selected and/or excluded based on the index.

According to one embodiment of the invention, it is preferable that the defect detection sensitivity is set based on the index.

According to one embodiment of the invention, it is preferable that the defect inspection method further includes setting an optical-system condition based on design data for the first sample.

According to one embodiment of the invention, it is preferable that the result of the defect inspection of the second sample includes sensitivity information indicative of detection sensitivity for the nuisance.

According to one embodiment of the invention, it is preferable that the information on the manufacturing capability for the product includes information on defect inspection and a review result for the product, and yield information of the product.

BRIEF DESCRIPTION OF THE DRAWINGS

FIG. 1 is a diagram showing an overview of the configuration of a defect inspection apparatus for use in a defect inspection method according to one embodiment.

DETAILED DESCRIPTION

Figure 2:
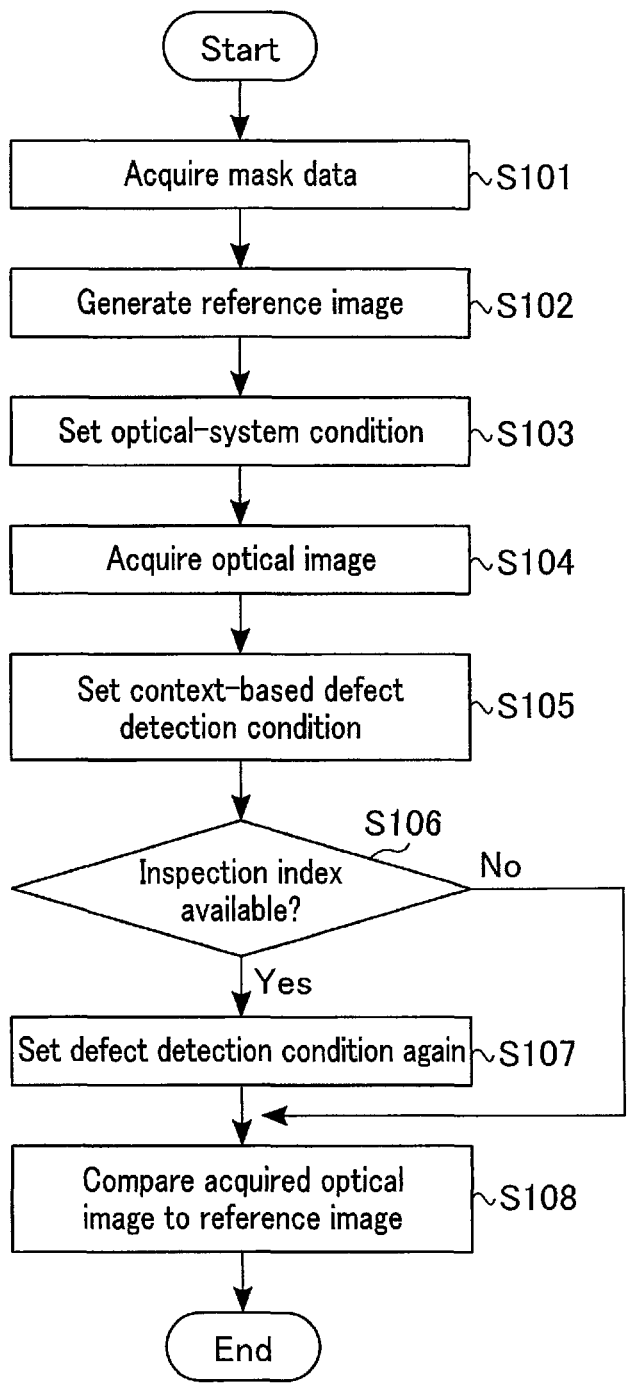
FIG. 2 is a flowchart showing defect inspection of a mask, performed with the defect inspection apparatus as the defect inspection method according to one embodiment.

The embodiment will now be described with reference to the drawings. The embodiment will exemplify apparatuses and methods for embodying the technical idea of the invention. The drawings are schematic or conceptual, and the dimensions, scales, etc., used in the drawings are not binding on actual products. The technical idea of the invention is not limited by particular component shapes, structures, arrangements, etc.

As one example, a defect inspection method for masks will be described. In the present embodiment, a case will be described where a sample of the inspection subject is a mask, but the embodiment is applicable to any inspection subject as long as they are substrates, etc. with patterns. For example, the sample may be a semiconductor substrate.

1. Configuration of Defect Inspection Apparatus

The description starts with an exemplary overall configuration of a defect inspection apparatus by referring to FIG. 1. FIG. 1 is a diagram showing an overview of the configuration of a defect inspection apparatus 1. In the present embodiment, a case will be described where the inspection apparatus is adapted to use light-receiving elements (photodiodes) to acquire optical images from the light reflected by or transmitted through the mask. However, the embodiment is not limited to such an inspection apparatus. The defect inspection apparatus may instead be adapted to use an optical microscope to acquire optical images of patterns, or use an SEM to acquire electron beam images of patterns.

As shown in FIG. 1, the defect inspection apparatus 1 includes an image acquisition mechanism 10 and a control mechanism 20. The image acquisition mechanism 10 has a configuration to acquire optical images of a mask 30. The control mechanism 20 controls the image acquisition mechanism 10 and detects a defect based on the optical image acquired by the image acquisition mechanism 10.

The image acquisition mechanism 10 includes a stage 101, an illumination source 111, a half mirror 112, mirrors 113 to 115 and 117, an illumination adjuster 118, lenses 116, 119, and 121, a beam splitter 120, an aperture 122, an imaging-light adjuster 123, and a light receiving sensor 124.

The stage 101 is for placing the mask 30 thereon. The stage 101 is adapted to move in the direction parallel to the surface of the stage 101, and to make rotational motions. The stage 101 may also be adapted to move in the direction vertical to the surface of the stage 101.

The illumination source 111 emits illumination light for defect inspection. For example, the illumination source 111 is a pulse laser emitter adapted to emit deep ultra-violet light (DUV light) of 199 nm.

The half mirror 112 divides the illumination light emitted from the illumination source 111 into two, i.e., one toward a transmitted-illumination-utilizing optical system and the other toward a reflected-illumination-utilizing optical system. More specifically, the illumination light portion that has passed through the half mirror 112 enters the transmitted-illumination-utilizing optical system. The transmitted-illumination-utilizing optical system adjusts the optical path for this illumination light for irradiating the mask 30 when the imaging utilizes illumination light transmitted through the mask 30 (also called "transmitted light" below). Also, the illumination light portion that has been reflected by the half mirror 112 enters the reflected-illumination-utilizing optical system. The reflected-illumination-utilizing optical system adjusts the optical path for this illumination light for irradiating the mask 30 when the imaging utilizes illumination light reflected by the mask 30 (also called "reflected light" below).

The mirrors 113, 114, and 115 are used in the transmitted-illumination-utilizing optical system so that the optical path for the illumination light that has passed through the half mirror 112 is adjusted.

The lens 116 in the transmitted-illumination-utilizing optical system causes the illumination light, of which the traveling direction has been changed by the mirror 115, to focus on the upper surface of the mask 30.

The mirror 117 is used in the reflected-illumination-utilizing optical system so that the optical path for the illumination light that has been reflected by the half mirror 112 is adjusted.

The illumination adjuster 118 adjusts the polarization direction and the flux amount of illumination light. The illumination adjuster 118 includes optical filters 118t and 118r. The optical filter 118t is arranged on the optical path between the mirror 114 and the mirror 115 in the transmitted-illumination-utilizing optical system, and is used for the adjustment of the polarization direction and the flux amount of illumination light there. The optical filter 118r is arranged on the optical path between the mirror 117 and the beam splitter 120 in the reflected-illumination-utilizing optical system, and is used for the adjustment of the polarization direction and the flux amount of illumination light there.

The lens 119, when in the transmitted-illumination-utilizing optical system, causes the illumination light that has been transmitted through the mask 30 (transmitted light) to focus on the beam splitter 120. The lens 119, when in the reflected-illumination-utilizing optical system, causes the illumination light that has been reflected by the beam splitter 120 after passing through the optical filter 118r to focus on the lower surface of the mask 30, and then causes the illumination light reflected by the mask 30 (reflected light) to focus on the beam splitter 120.

The beam splitter 120 in the reflected-illumination-utilizing optical system reflects the illumination light that has passed through the optical filter 118r, so that the illumination light travels toward the lens 119. The beam splitter 120 also permits the transmitted light or the reflected light, focusing thereon via the lens 119, to be transmitted therethrough.

The lens 121 causes each of the transmitted light and the reflected light that has been transmitted through the beam splitter 120 to focus on the aperture 122.

The aperture 122 is used for shaping each of the transmitted light and the reflected light, focusing thereon via the lens 121. The aperture 122 includes openings 122t and 122r. The opening 122t is for shaping the transmitted light. The opening 122r is for shaping the reflected light.

The imaging-light adjuster 123 adjusts the polarization direction and the flux amount of the illumination light (each of the transmitted light and the reflected light) that forms an image on the light receiving sensor 124. The imaging-light adjuster 123 includes optical filters 123t and 123r. The optical filter 123t is used for the adjustment of the polarization direction and the flux amount of the transmitted light. The optical filter 123r is used for the adjustment of the polarization direction and the flux amount of the reflected light.

The light receiving sensor 124 is adapted to sense each of the received transmitted light and the received reflected light. The light receiving sensor 124 includes photodiode arrays 124t and 124r. The photodiode array 124t generates electrical signals by photoelectrically converting the transmitted light that has passed through the optical filter 123t. The photodiode array 124r generates electrical signals by photoelectrically converting the reflected light that has passed through the optical filter 123r. The photodiode arrays 124t and 124r send the generated electrical signals to image data input circuit 260, which will be described later. The photodiode arrays 124t and 124r each include anon-illustrated image sensor. Such an image sensor may be a line sensor in which multiple CCD cameras as imaging elements are linearly arranged. Examples of the line sensor include a time delay integration (TDI) sensor. In one exemplary implementation, the TDI sensor images patterns on the mask 30 placed on the continuously moving stage 101.

The control mechanism 20 includes apparatus control circuit 200, storage circuit 210, inspection condition setting circuit 220, illumination condition setting circuit 230, imaging condition setting circuit 240, reference image generator 250, image data input circuit 260, and comparator 270. Note that the components, namely, the inspection condition setting circuit 220, the illumination condition setting circuit 230, the imaging condition setting circuit 240, the reference image generator 250, the image data input circuit 260, and the comparator 270 may be formed or realized by a program or programs executed by integrated circuitry such as any one or more of a central processing unit (CPU), an application specific integrated circuit (ASIC), a field programmable gate array (FPGA), a graphics processing unit (GPU), and so on. The components may instead be formed or realized by hardware and/or firmware included in the integrated circuitry, or by respective, discrete circuits controlled by the integrated circuitry. Hereinafter, a case will be described where these components take the form of a defect inspection program for execution by the apparatus control circuit 200.

The apparatus control circuit 200 takes total control over the defect inspection apparatus 1. More specifically, the apparatus control circuit 200 controls the image acquisition mechanism 10 to acquire optical images. Also, the apparatus control circuit 200 controls each member in the control mechanism 20 to compare the acquired optical images with reference images to detect defects. In an exemplary configuration, the apparatus control circuit 200 includes a CPU, a random access memory (RAM), and a read only memory (ROM), which are not illustrated. For example, the CPU loads the defect inspection program stored in the ROM into the RAM. The CPU then runs the defect inspection program loaded in the RAM to control the defect inspection apparatus 1. Note that the defect inspection program may be stored in the storage circuit 210 instead of the ROM. The apparatus control circuit 200 may take any form, for example, a CPU device such as a microprocessor, or a computer device such as a personal computer. It is also possible that the functions of the apparatus control circuit 200 are covered, at least in part, by other integrated circuitry such as an ASIC, an FPGA, and/or a GPU.

The storage circuit 210 is adapted to store information for defect inspection. More specifically, the storage circuit 210 stores mask data (design data) for the mask 30, setting data for inspection conditions, inspection data, and so on. Examples of the setting data for inspection conditions include optical-system conditions for the image acquisition mechanism 10, defect detection conditions, later described inspection indexes, etc. The inspection data includes reference image data, optical image data, and data on detected defects (such as coordinates and sizes). Note that the storage circuit 210 may be a non-transitory storage medium storing the defect inspection program for execution by the apparatus control circuit 200. Note also that the storage circuit 210 may be an external storage that is constituted by a hard disk drive (HDD) such as a magnetic disc storage, a solid state drive (SDD), or the like.

The inspection condition setting circuit 220 sets conditions (optical-system conditions) for acquiring one or more optical images in the image acquisition mechanism 10.

The inspection condition setting circuit 220 also sets a defect detection condition. More specifically, and for example, the inspection condition setting circuit 220 has a function of categorizing and grouping defects according to their shapes, sizes, detected locations (shapes of the neighboring patterns), etc. The inspection condition setting circuit 220 also has a function of adjusting the detection sensitivity by, for example, varying the thresholds for defect detection signals. The inspection condition setting circuit 220 also has a function of sorting out (filtering out) a nuisance according to defect detection signals, based on a tendency that has been extracted as a common characteristic from multiple defect detection signals associated with defects determined as nuisances. The inspection condition setting circuit 220 also has a defect review function of, for example, determining if a detected defect would not constitute any trouble in the manufacture of semiconductor devices, or if it is a defect comparable with the defect in the result of a reference defect inspection. Further, the inspection condition setting circuit 220 has a context-based function of setting a defect detection condition using, as elements in the sampling (detecting) scheme, the aforementioned defect categorization, defect grouping, adjustment of the defect detection sensitivity, nuisance filtering, defect review, and so on.

In the present embodiment, the inspection condition setting circuit 220 has an edit function of selecting and/or excluding the elements constituting the context-based function, adding new elements, changing the detection sensitivity, etc., based on one or more inspection indexes input via a non-illustrated input/output circuit from an external entity or entities. In other words, the inspection condition setting circuit 220 can update the defect detection condition based on the inspection index. The inspection index is an index for changing the defect detection condition which is prepared based on defect inspection of one or more masks different from the mask being inspected, and the review results or the yield information associated with such one or more masks.

More specifically, and for example, the inspection condition setting circuit 220 can change the defects to be filtered out as nuisances in accordance with the purposes of a user by changing, based on the inspection index, group divisions used at the time of performing the defect grouping. The inspection condition setting circuit 220, by changing the defect detection sensitivity, can suppress the number of detected nuisances, which are subtle defects that will not affect semiconductor devices. The inspection condition setting circuit 220 can also change the threshold for discriminating between a DOI and a nuisance. These features enable the defect inspection apparatus 1 to detect nuisances with an enhanced accuracy in concordance with the purposes of a user, and to reduce the number of defects to be discriminated as nuisances.

The inspection conditions (the optical-system conditions and the defect detection condition) set by the inspection condition setting circuit 220, the inspection indexes input from external entities, etc. are stored in the storage circuit 210.

The illumination condition setting circuit 230 controls the illumination source 111 and the illumination adjuster 118 based on the inspection conditions set by the inspection condition setting circuit 220. For example, the illumination condition setting circuit 230 controls the illumination adjuster 118 to select one or both of the transmitted-illumination-utilizing optical system and the reflected-illumination-utilizing optical system. The illumination condition setting circuit 230, by adjusting the illumination light, allows for the acquisition of optical images of various characteristics according to the differences in type and size of patterns on masks.

The imaging condition setting circuit 240 controls the imaging-light adjuster 123 based on the inspection conditions set by the inspection condition setting circuit 220. For example, the imaging condition setting circuit 240 controls the imaging-light adjuster 123 to select one or both of the transmitted light and the reflected light. Also, the imaging condition setting circuit 240 may control the illumination adjuster 118 to adjust (suppress) the spatial frequencies in the imaging domain. For example, the apparatus control circuit 200 may suppress the spatial frequencies for facilitating the discrimination between DOIs and nuisances.

The reference image generator 250 generates reference images based on, for example, the mask data stored in the storage circuit 210. The reference image generator 250 sends the generated reference images to the comparator 270. Note that the reference image generator 250 may adopt, as the reference image, one of the optical images of multiple regions of a mask that have the same pattern, or the optical image of a region of a different mask having the same pattern.

The image data input circuit 260 receives data of the multiple optical images acquired using the multiple optical-system conditions from the light receiving sensor 124. The image data input circuit 260 sends the received optical image data to the comparator 270.

The comparator 270 makes a comparison between the optical image and the reference image using suitable algorithms. A signal (defect detection signal) obtained by the comparison is determined based on the defect detection condition set by the inspection condition setting circuit 220. The inspection results (inspection data) are stored in the storage circuit 210. Note that the defect inspection apparatus 1 may include a display or the like to present the inspection results.

2. Flow of Defect Inspection of Mask with Defect Inspection Apparatus

Next, with reference to FIG. 2, a description will be given of an exemplary flow of the defect inspection of a mask, performed with the defect inspection apparatus 1. FIG. 2 is a flowchart showing the defect inspection of a mask, performed with the defect inspection apparatus 1. Hereinafter, a case will be described where the D-DB mode is used. However, the inspection mode may instead be the D-D mode.

First, as shown in FIG. 2, mask data of the inspection subject is obtained (step S101). The obtained mask data is stored in the storage circuit 210.

The reference image generator 250 generates a reference image based on the mask data (step S102). The reference image generator 250 sends the generated reference image to the storage circuit 210 or the comparator 270. If in the D-D mode, the reference image generator 250 generates a reference image based on an optical image of the same pattern.

The inspection condition setting circuit 220 sets an optical-system condition for the image acquisition mechanism 10 based on, for example, the mask data (step S103). The inspection condition setting circuit 220 here may set optical-system conditions as the conditions for acquiring optical images.

The image acquisition mechanism 10 acquires one or more optical images based on the set one or more optical-system conditions (step S104). More specifically, the mask 30 is placed on the stage 101. The illumination condition setting circuit 230 controls the illumination source 111 to emit DUV light. The illumination condition setting circuit 230 also adjusts the optical path of the illumination light and controls the illumination adjuster 118 based on the corresponding optical-system condition set by the inspection condition setting circuit 220. The imaging condition setting circuit 240 controls the imaging-light adjuster 123 based on the corresponding optical-system condition set by the inspection condition setting circuit 220. In this state, the stage 101 is moved so that the illumination light scans the mask 30 through the corresponding optical system. The illumination light that has been transmitted through or reflected by the mask 30 forms an image on the light receiving sensor 124. The light receiving sensor 124 sends the thus acquired image data to the image data input circuit 260. Multiple optical images can therefore be sequentially acquired. Note that the reference image generation and the optical image acquisition may be performed in any order or simultaneously.

Upon finishing the optical image acquisition, the inspection condition setting circuit 220 sets a defect detection condition using the context-based function based on, for example, the mask data (reference image) and the acquired optical images (step S105).

If a relevant inspection index is stored in the storage circuit 210 (step S106_Yes), the inspection condition setting circuit 220 sets (updates) the defect detection condition based on the inspection index (step S107).

If no relevant inspection index is stored in the storage circuit 210 (step S106_No), or after the defect detection condition is set based on the inspection index, the comparator 270 makes a comparison between the reference image and the acquired optical image (step S108). The comparator 270 determines whether or not the signal obtained by the comparison and representing the difference between the reference image and the optical image is indicative of a defect, based on the defect detection condition. The comparator 270 then groups the detected defects and determines whether each defect is a DOI or a nuisance. The comparator 270 stores inspection results including information about each defect (its coordinates, size, shape, applicability to a DOI or a nuisance, etc.) as well as the corresponding optical image and reference image constituting the grounds of the defect determination, in the storage circuit 210. Note that the results stored in the storage circuit 210 may be presented through the non-illustrated display or the like, and/or output to one or more external devices (e.g., reviewing equipment) via the non-illustrated input/output circuit.

In the present embodiment, a case has been described where the inspection condition setting circuit 220 first sets a defect detection condition using the context-based function and then changes the defect detection condition based on an inspection index. However, the step of setting a defect detection condition using the context-based function may be omitted. That is, the inspection condition setting circuit 220 may set the defect detection condition based directly on the inspection index.

3. Flow of Operations from Mask Design to Device Manufacture

Figure 3:
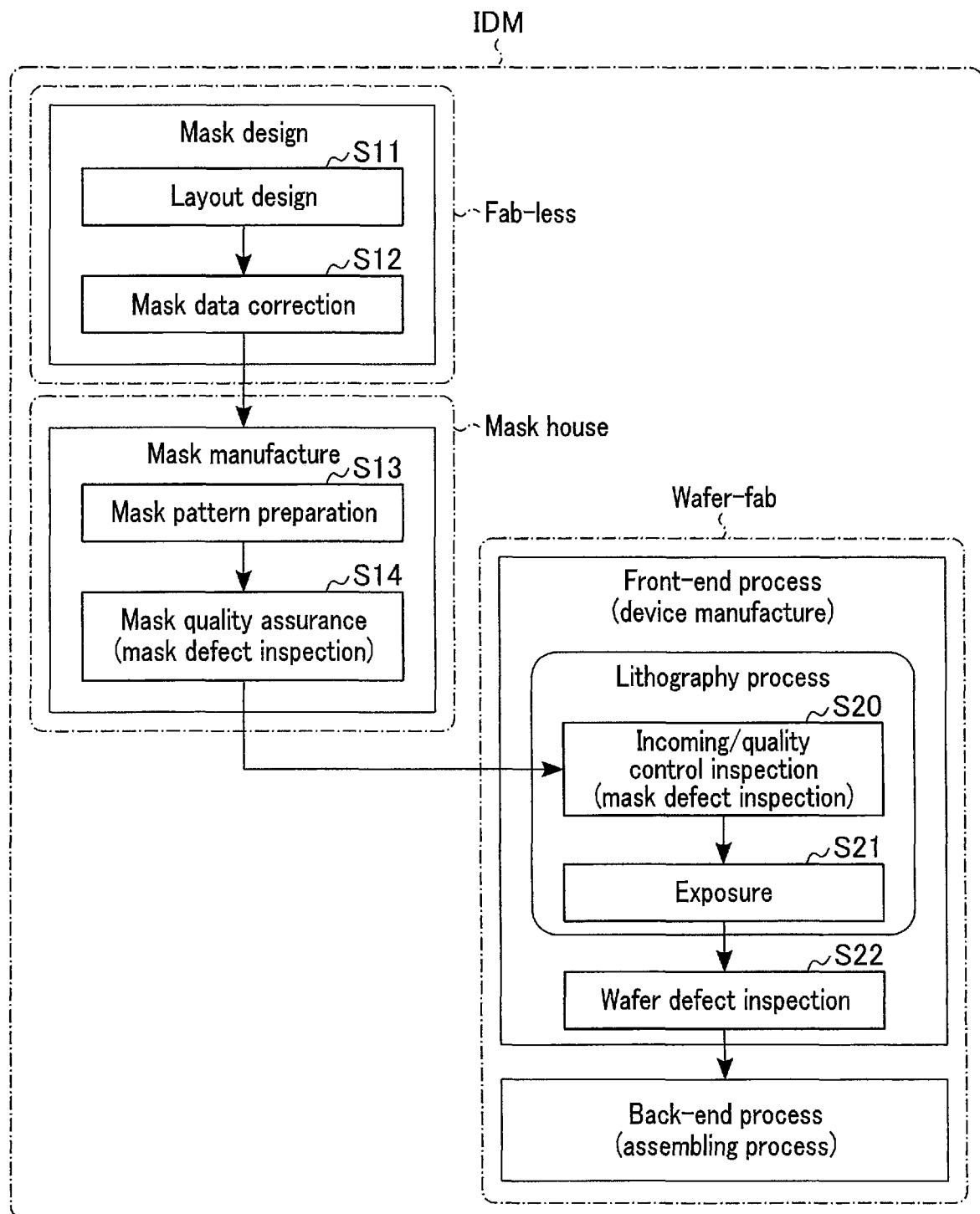
FIG. 3 is a flowchart showing, with a focus on one mask, a flow of operations from the design of the mask to the manufacture of semiconductor devices.

Next, FIG. 3 will be referred to for describing an exemplary flow of operations from the design of a mask to the manufacture of devices with a focus on one mask. FIG. 3 is a flowchart showing such a flow of operations from the mask design to the device manufacture. In the description below, a device manufacturer that undertakes operations from the mask design to the manufacture of semiconductor devices will be called an "integrated device manufacturer (IDM)". A device manufacturer that designs a mask but does not manufacture the mask or semiconductor devices will be called a "fabrication facility-less (fab-less)". Where the description does not specifically intend a device manufacturer to be one of an IDM and a fab-less, such a device manufacturer will be simply called a "device manufacturer". An entity that undertakes the manufacture of a mask will be called a "mask house". In some instances, an IDM may outsource the mask manufacture to a mask house due to increases in costs of the development and manufacture of semiconductor devices. Also, an entity (factory) that undertakes the semiconductor device manufacture on behalf of an IDM or a fab-less will be called a "wafer fabricator (wafer-fab)". In some instances, an IDM may outsource a portion of the manufacture to a wafer-fab according to the manufacturing capacity of its own manufacturing line.

First, as shown in FIG. 3, a device manufacturer (an IDM or a fab-less) conducts the layout design of a circuit pattern for semiconductor devices (step S11).

Next, circuit data obtained by the layout design is subjected to a mask data correction process using, for example, a resolution enhancement technique such as optical proximity correction (OPC) or inverse lithography technology (ILT) (step S12), so that mask data is prepared.

In the instance where the device manufacturer entrusts a mask house with the mask manufacture, the device manufacturer sends the mask data to the mask house.

The mask house uses mask drawing equipment to form (draw) a mask pattern on a blank mask based on the received mask data (step S13).

The manufactured mask is then tested for quality assurance (step S14). More specifically, size and coordinate measurement of the mask pattern, defect inspection of the mask, etc. are conducted. Here, for example, the mask house sets a standard for the quality assurance test according to the product ranks from the viewpoint of guaranteeing the quality of products (masks) released. A mask that has passed the quality assurance test is affixed with a pellicle. The mask with an affixed pellicle is then delivered together with a test record showing the test results to the IDM or the wafer-fab.

With the delivered mask, the IDM at its manufacturing department or the wafer-fab manufactures semiconductor devices (also called a "front-end process"). Here, in a lithography process, the incoming inspection or the quality control inspection of the mask (also called an "incoming/quality control inspection") is performed (step S20).

More specifically, the mask that has been delivered from the mask house undergoes the incoming inspection including the defect inspection.

It is known that a mask will gradually become contaminated during repeated use in exposure equipment due to the irradiation by exposure light, the environmental influence, etc. Also a pellicle, when affixed on the mask surface, is periodically replaced. Thus, a mask for use in the lithography process is subjected to quality control inspection including defect inspection on a regular basis for quality control purposes.

A mask that has passed the incoming/quality control inspection is used for the exposure operation in the exposure equipment (step S21).

After the exposure operation or the circuit pattern formation, wafers are subjected to defect inspection (step S22). At this time, the defects are reviewed for at least some of the wafers (or chips).

Upon completing the front-end process, a back-end process (also called an "assembling process") is performed where, for example, chips that have passed a characteristic inspection are used for assembly. Subsequently, products that have passed a shipping inspection are released.

4. Concrete Examples of Defect Inspection of Masks

Next, concrete examples of the defect inspection of masks will be described. The purpose of mask defect inspection differs depending on the user who conducts the inspection. As one example, a mask house conducts the inspection for the quality assurance of the mask to be shipped. On the other hand, a wafer-fab could conduct the inspection for the purpose of checking the change in transmittance of exposure light transmitted through the mask, or checking the presence of foreign substances on the mask. For example, how to cope with various defects detected by the inspection can differ according to the technical level of the wafer-fab. Also, an IDM could conduct the inspection for the purpose of providing feedback to the mask design in order to improve the yields of semiconductor devices.

As such, the procedure to prepare the inspection index differs depending on the users. Hereinafter, a case will be described where the defect inspection method for a mask is performed by a mask house, a wafer-fab, and an IDM, respectively.

4.1. Mask Defect Inspection Method in Mask House

Figure 4:
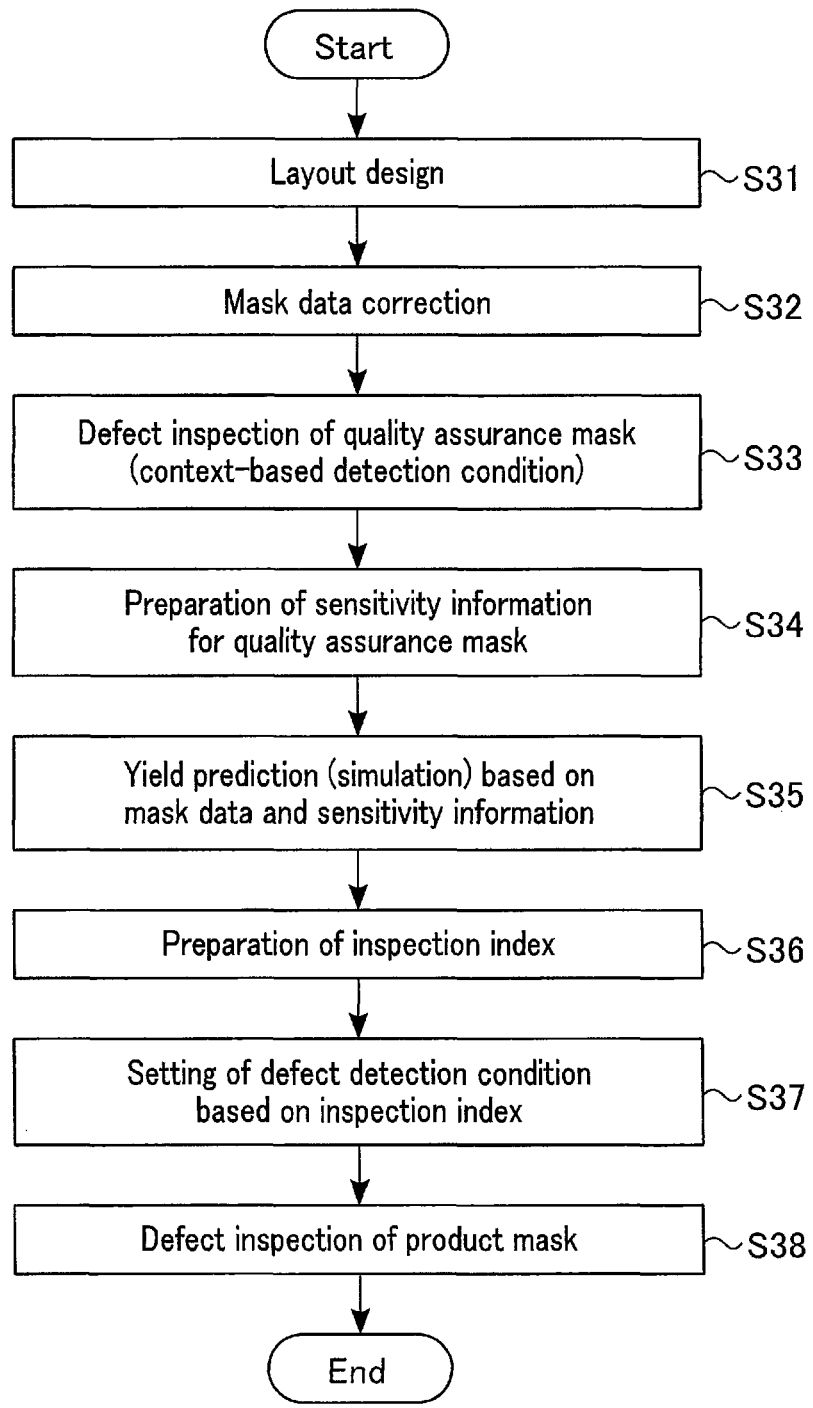
FIG. 4 is a flowchart showing the defect inspection method according to one embodiment when performed by a mask house.
Figure 5:
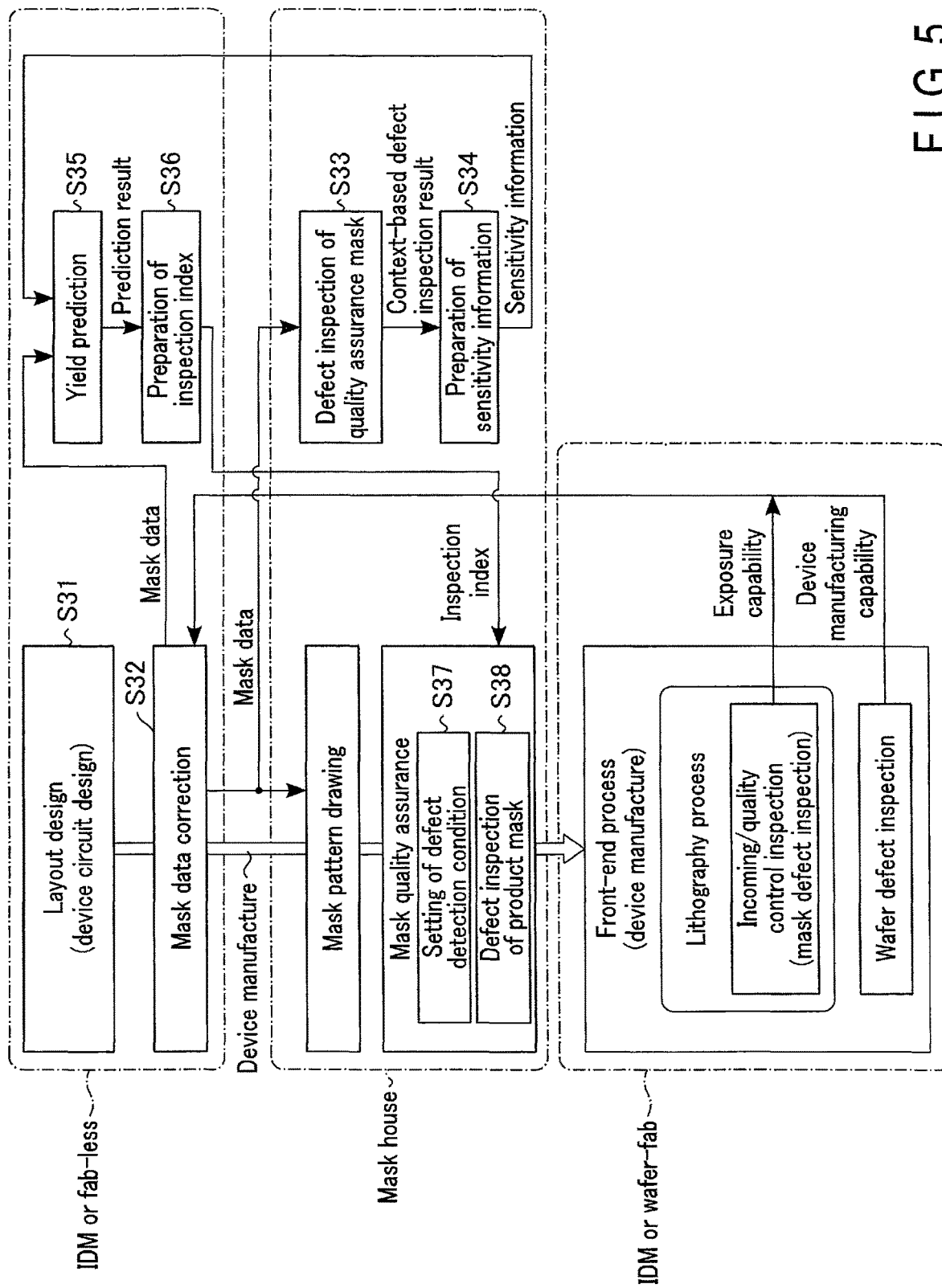
FIG. 5 is a diagram showing flows of information (data) in the course of the defect inspection method according to one embodiment when performed by a mask house.

First, a description will be given of an instance where the defect inspection method for a mask is performed by a mask house, with reference to FIGS. 4 and 5. FIG. 4 is a flowchart showing the defect inspection of a mask, performed by a mask house. FIG. 5 is a diagram showing the flows of information (data) in the course of the defect inspection performed by the mask house. In the description below, the mask for use in the manufacture of semiconductor devices will be called a "product mask". Also, a mask which is formed of a test pattern that considers and reflects various defects and which is used for checking the defect detection sensitivity of the defect inspection apparatus 1, that is, used for assuring the capability of the defect inspection apparatus 1, will be called a "quality assurance mask".

As shown in FIGS. 4 and 5, an IDM or a fab-less first conducts the layout design of a circuit pattern (step S31).

The IDM at its design department or the fab-less obtains, from the manufacturing department of the IDM or the wafer-fab, information sets including information on the capability of exposure equipment (also called "exposure capability information"), information on the device manufacturing capability of the manufacturing line including defect inspection information and review information of wafers, and yield information. The IDM at the design department or the fab-less then corrects circuit data obtained by the layout design based on the exposure capability information and the information on the device manufacturing capability (step S32), so that mask data is prepared. Here, the circuit data is corrected according to the device manufacturing capability of the manufacturing line to be used, with the aim of realizing predetermined performance (i.e., yields) at the desired cost.

The mask house receives the mask data from the entity which ordered the mask manufacture, i.e., the IDM or the fab-less.

The mask house performs the defect inspection of a quality assurance mask having a test pattern corresponding to the received mask data, using the defect inspection apparatus 1 (step S33). At this time, the inspection condition setting circuit 220 with the context-based function sets a defect detection condition.

Next, the mask house specifies whether the detected defect is a DOI or a nuisance using, for example, the review function of the defect inspection apparatus 1, an SEM, a pattern transfer evaluation device that uses a light source having a wavelength of the exposure light, or the like. Then, based on the result of the defect inspection of the quality assurance mask under the context-based defect detection condition, and also on the result of discrimination between a DOI and a nuisance, the mask house prepares sensitivity information indicative of the DOI and nuisance detection sensitivity under the defect detection condition based on the context-based function (step S34). Note that the sensitivity information may include various parameter information sets for the context base and information on the drawing capability of the mask drawing equipment. The mask house presents the prepared sensitivity information to the entity which ordered the mask manufacture, i.e., the IDM or the fab-less. That is, the mask house presents detection values of the defect inspection apparatus 1 that can be assured based on the quality assurance mask, to the entity which ordered the mask manufacture.

The IDM or the fab-less, as the entity which ordered the mask manufacture, predicts the yields based on the mask data and the sensitivity information (step S35). More specifically, and for example, the IDM or the fab-less conducts simulations, etc. to confirm or predict if preparation of a product mask using the mask data would lead to the targeted effect of the mask data correction process and also the desired yields in the manufacture of semiconductor devices with the product mask based on the above-discussed mask quality assurance (defect inspection of the mask) by the defect inspection apparatus 1. Note that the simulations here may also utilize the exposure capability information and the information on the device manufacturing capability.

Next, the IDM or the fab-less as the entity which ordered the mask manufacture prepares, from the result of predicting the yields, an inspection index for changing the defect detection condition for the defect inspection apparatus 1 (step S36). More specifically, the IDM or the fab-less prepares the inspection index for designating selection and/or exclusion of the elements constituting the context-based function, addition of new elements, change of the detection sensitivity for nuisances, etc., so that the defect detection condition for the defect inspection apparatus 1 can maximize the detection sensitivity for DOIs while suppressing the number of nuisances detected. Note that when, for example, the mask house presents items of the sensitivity information corresponding to multiple optical-system conditions to the IDM or the fab-less, the inspection index may include information for the optimum optical-system condition. In this case, the inspection condition setting circuit 220 of the defect inspection apparatus 1 may set the optical-system condition based on the inspection index. The IDM or the fab-less sends the prepared inspection index to the mask house.

The mask house inputs the inspection index to the defect inspection apparatus 1. The inspection condition setting circuit 220 sets (updates) the defect detection condition based on the input inspection index (step S37).

The defect inspection apparatus 1 conducts defect inspection of the product mask under the defect detection condition set based on the inspection index (step S38).

As described above, the IDM or the fab-less predicts yields based on the result of defect inspection of a quality assurance mask and mask data, and prepares an inspection index based on the prediction result. The mask house then sets defect inspection conditions based on the inspection index and conducts defect inspection of a product mask under the set defect inspection conditions. As a result, it is possible to realize defect detection in the mask while suppressing the number of nuisances detected.

4.2. Mask Defect Inspection Method in Wafer-Fab

Figure 6:
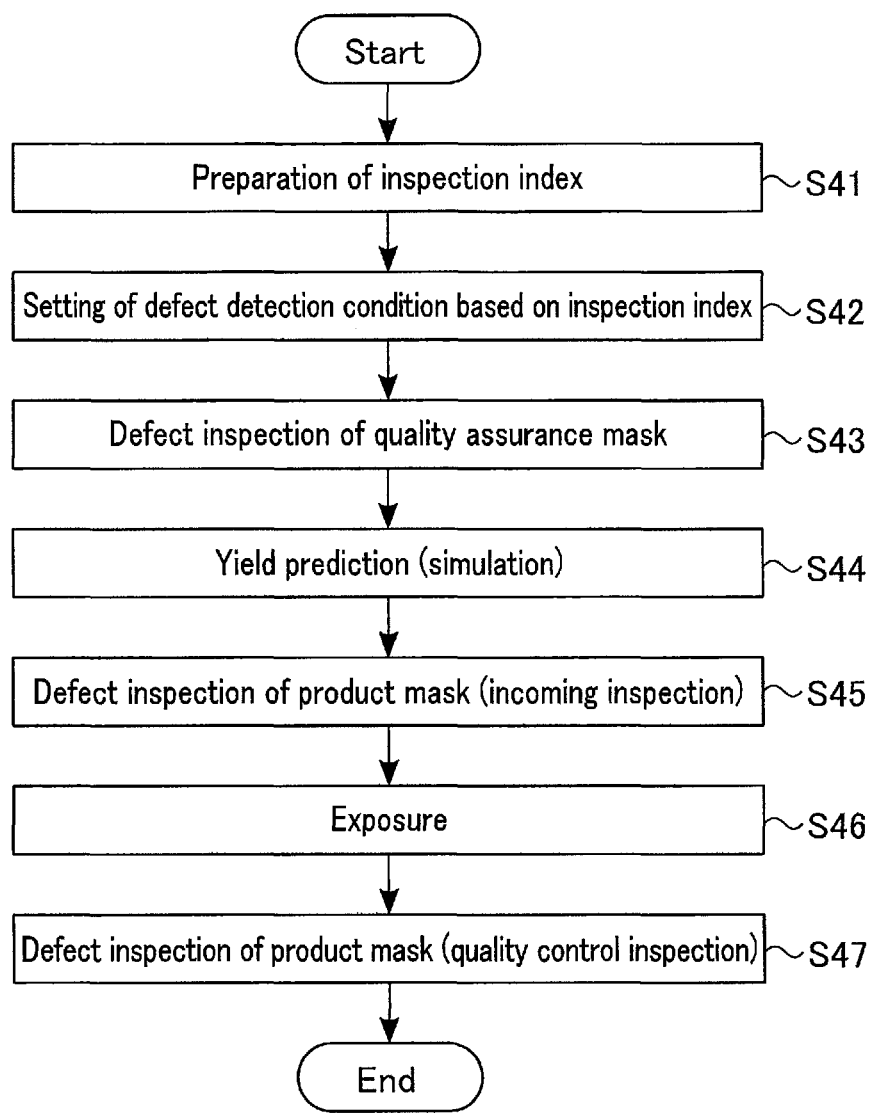
FIG. 6 is a flowchart showing the defect inspection method according to one embodiment when performed by a wafer-fab.
Figure 7:
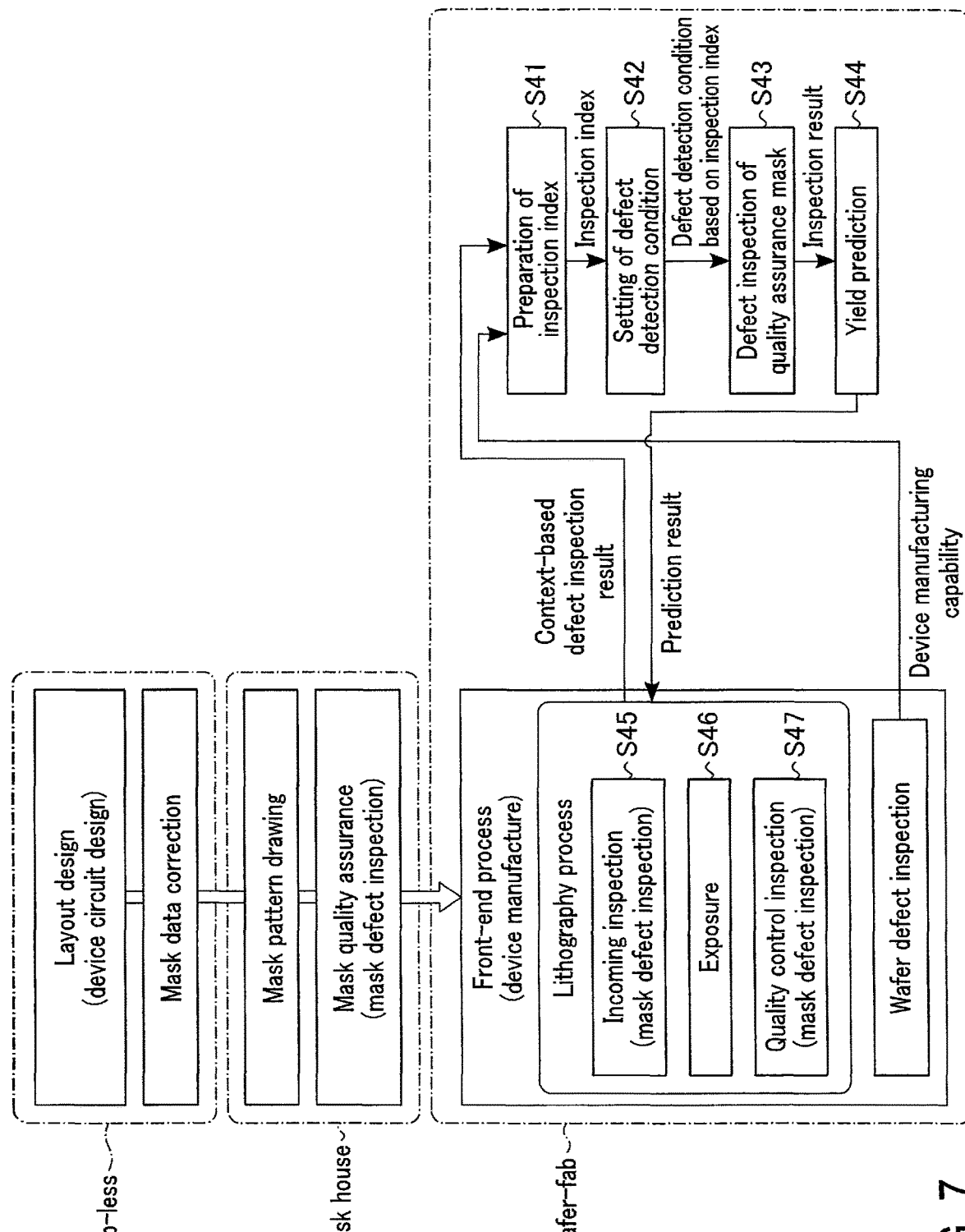
FIG. 7 is a diagram showing flows of information (data) in the course of the defect inspection method according to one embodiment when performed by a wafer-fab.

Next, a description will be given of an instance where the defect inspection method for a mask is performed by a wafer-fab, with reference to FIGS. 6 and 7. FIG. 6 is a flowchart showing the defect inspection of a mask, performed during the incoming/quality control inspection by a wafer-fab. FIG. 7 is a diagram showing the flows of information (data) in the course of the defect inspection performed by the wafer-fab.

As shown in FIGS. 6 and 7, the wafer-fab conducts defect inspection using a product mask which is not an inspection subject, under the defect detection condition based on the context-based function. The wafer-fab then considers the result of the defect inspection of this product mask and also information on the device manufacturing capability for semiconductor devices exhibited when this product mask is used (information on defect inspection and review results for wafers, yield information, and so on) to prepare an inspection index (step S41). More specifically, the wafer-fab prepares an inspection index for designating selection and/or exclusion of the elements constituting the context-based function, addition of new elements, change of the detection sensitivity for nuisances, etc., so that the defect detection condition for the defect inspection apparatus 1 can maximize the detection sensitivity for DOIs while suppressing the number of nuisances detected. For example, the wafer-fab may prepare the inspection index with particular attention to the type of an inspected defect (e.g., particles) so that the detection sensitivity for this type is maximized while the number of detected nuisances is reduced.

The prepared inspection index is input to the defect inspection apparatus 1. The inspection condition setting circuit 220 sets (updates) the defect detection condition based on the input inspection index (step S42).

The defect inspection apparatus 1 conducts defect inspection of a quality assurance mask under the set defect detection condition (step S43).

Based on the result of the defect inspection of the quality assurance mask, the wafer-fab then predicts yields using simulations, etc. (step S44). Here, the simulations may also utilize the context-based defect detection conditions and the information on the device manufacturing capability. If the yield prediction is that the desired yields will not be attainable, the inspection index may be corrected.

If it is confirmed from the result of the yield prediction that the desired yields will be attainable, the defect inspection apparatus 1 conducts incoming inspection (defect inspection) of a product mask received from a mask house under the defect detection condition set based on the inspection index (step S45).

The wafer-fab performs an exposure operation in the front-end process, using the product mask that has passed the incoming inspection (step S46).

In order to maintain and control the quality of product masks, the defect inspection apparatus 1 undergoes a routine checkup for the defect detection capability using the quality assurance mask. The quality control inspection of the product mask used for the exposure operation is conducted by the defect inspection apparatus 1 whose defect detection capability is managed based on the quality assurance mask (step S47).

As described above, the wafer-fab prepares an inspection index based on the result of defect inspection of a non-subject product mask and also information on the associated device manufacturing capability (information on defect inspection and review results for wafers, yield information, and so on). The wafer-fab then sets defect inspection conditions based on the inspection index, conducts defect inspection of a quality assurance mask under the set defect inspection conditions, and predicts yields from the result of this defect inspection. Further, upon confirming that the desired yields will be attainable, the wafer-fab conducts defect inspection of a target product mask. As a result, it is possible to realize defect detection in the mask while suppressing the number of nuisances detected.

4.3. Mask Defect Inspection Method in IDM

Figure 8:
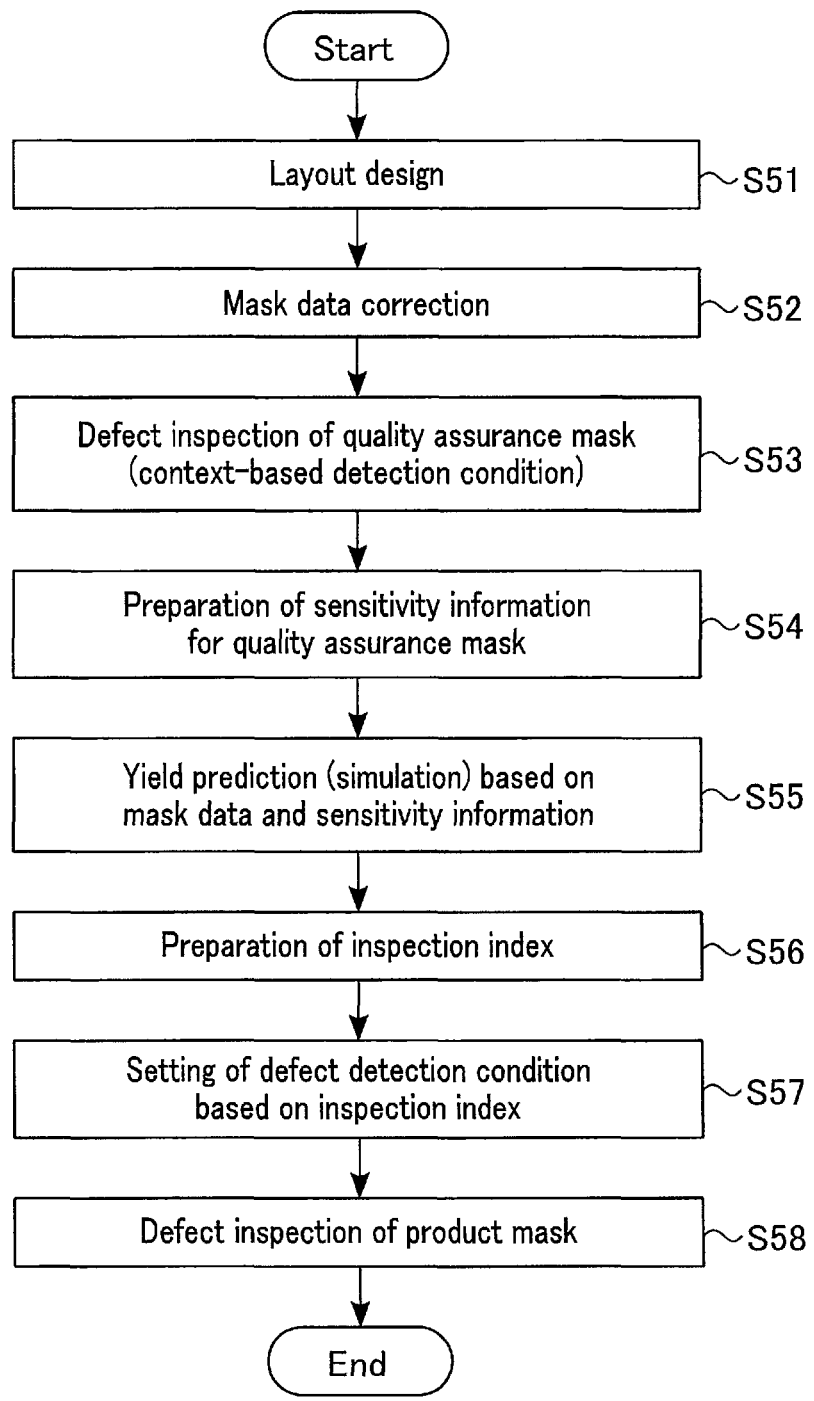
FIG. 8 is a flowchart showing the defect inspection method according to one embodiment when performed by an IDM.
Figure 9:
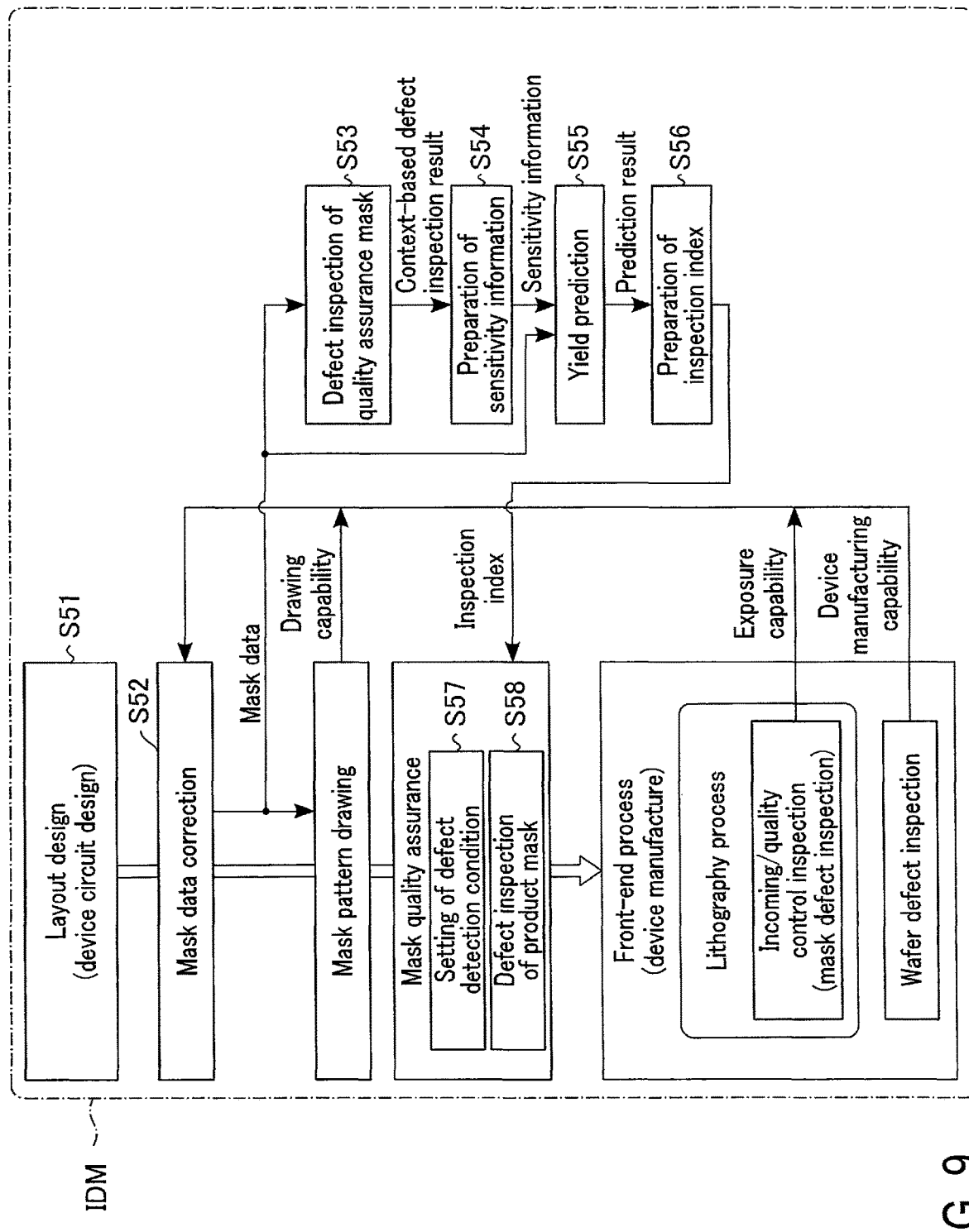
FIG. 9 is a diagram showing flows of information (data) in the course of the defect inspection method according to one embodiment when performed by an IDM.

A description will be given of an instance where the defect inspection method for a mask is performed by an IDM, with reference to FIGS. 8 and 9. FIG. 8 is a flowchart showing the defect inspection of a mask, performed by an IDM. FIG. 9 is a diagram showing the flows of information (data) in the course of the defect inspection performed by the IDM. Note that the example illustrated by FIGS. 8 and 9 shows that the IDM manufactures a mask and also semiconductor devices.

As shown in FIGS. 8 and 9, the IDM first conducts the layout design of a circuit pattern (step S51).

The IDM then corrects circuit data obtained by the layout design based on various information, including information on the drawing capability of mask drawing equipment, exposure capability information, and information on device manufacturing capability (step S52), so that mask data is prepared. Here, the circuit data is corrected according to the device manufacturing capability of the manufacturing line (equipment) to be used, with the aim of realizing a predetermined performance at the desired cost.

The defect inspection apparatus 1 performs the defect inspection of a quality assurance mask having a test pattern corresponding to the mask data (step S53). At this time, the inspection condition setting circuit 220 with the context-based function sets a defect detection condition.

Next, the IDM specifies whether the detected defect is a DOI or a nuisance using, for example, the review function of the defect inspection apparatus 1, an SEM, a pattern transfer evaluation device that uses a light source having a wavelength of the exposure light, or the like. Then, based on the result of the defect inspection of the quality assurance mask and also the result of discrimination between a DOI and a nuisance, the IDM prepares sensitivity information indicative of the DOI and nuisance detection sensitivity under the defect detection condition based on the context-based function (step S54). Note that the sensitivity information may include various parameter information sets for the context base and information on the drawing capability of the drawing equipment.

The IDM then predicts yields based on the mask data and the sensitivity information (step S55). Here, the IDM conducts simulations, etc. to confirm or predict if preparation of a product mask using the mask data would lead to the targeted effect of the mask data correction process and also the desired yields in the manufacture of semiconductor devices with the product mask based on the mask quality assurance (defect inspection of the mask) by the defect inspection apparatus 1. Note that the simulations may also utilize the exposure capability information and the information on the device manufacturing capability.

Next, the IDM prepares, from the result of predicting the yields, an inspection index for changing the defect detection condition for the defect inspection apparatus 1 (step S56). More specifically, the IDM prepares an inspection index for designating selection and/or exclusion of the elements constituting the context-based function, addition of new elements, change of the detection sensitivity for nuisances, etc., so that the defect detection condition for the defect inspection apparatus 1 can maximize the detection sensitivity for DOIs while suppressing the number of nuisances detected. For example, the IDM may prepare the inspection index so that the detection sensitivity for a defect (fine pattern) that would likely occur when applying the ILT technique to the mask design is maximized while the number of detected nuisances is reduced.

The prepared inspection index is input to the defect inspection apparatus 1, and the inspection condition setting circuit 220 sets (updates) the defect detection condition based on the input inspection index (step S57).

The defect inspection apparatus 1 conducts defect inspection of the product mask under the defect detection condition set based on the inspection index (step S58).

In other words, the IDM predicts yields based on the result of defect inspection of a quality assurance mask and mask data, and prepares an inspection index based on the prediction result. The IDM then sets defect inspection conditions based on the inspection index and conducts defect inspection of a product mask under the set defect inspection conditions. As a result, it is possible to realize defect detection in the mask while suppressing the number of nuisances detected.

5. Effects of Embodiment

Suppose that a review is conducted after defect inspection of a mask. In this case, if many defects corresponding to nuisances are detected in the defect inspection of the mask, the processing load of review will increase. Thus, for example, the number of defects to be detected may be reduced by lowering the defect detection sensitivity of a defect inspection apparatus. However, such an option of lowering the defect detection sensitivity also lowers the detection sensitivity for DOIs and will likely degrade yields of products.

With the configuration according to the embodiment, an inspection index is prepared based on information such as the result of defect inspection of wafers obtained with a mask different from the inspection subject mask. The defect inspection conditions are then set based on the inspection index so that the defect inspection of the inspection subject mask will be conducted. Accordingly, the defect inspection conditions for the defect inspection apparatus 1 can reflect the user's desired discrimination criteria for DOIs and nuisances. In other words, the configuration according to the embodiment does not aim at recovering the yields by post-processing utilizing the outcome from a defect inspection apparatus. Rather, the configuration according to the embodiment allows the quality assurance mask, which is used for adjusting the sensitivity of a defect inspection apparatus according to the business type of each user (an IDM, a mask house, a wafer-fab, etc.), to reflect the information for detecting a defect that would constitute a cause of degraded yields, so that the sensitivity of a defect inspection apparatus can be optimized for each user. Therefore, the detection sensitivity for DOIs can be maximized while the number of detected nuisances is reduced. That is, the embodiment allows for the setting of defect detection conditions for a defect inspection apparatus to reduce the ratio of nuisances to DOIs.

6. Modifications, etc.

Note that, while the foregoing embodiment has been described that the instance of using the D-DB mode, the embodiment is not limited to this. For example, the embodiment is applicable also to the D-D mode.

Moreover, while the foregoing embodiment has described that a sample is a mask, the sample may instead be a semiconductor substrate or the like.

The present invention is not limited to the embodiments described above, and various modifications may be implemented without departing from the concept or scope of the present invention.

In the embodiments described above, descriptions for portions which are not directly required for explaining the present invention, such as detailed configurations of devices and control methods, are omitted. However, it should be noted that the configurations of the devices and the control methods can be suitably selected and used as required. All inspection methods and inspection apparatuses that comprise the elements of the present invention and that can be suitably modified by a person with ordinary skill in the art are encompassed in the scope of the present invention.

The invention claimed is:

1. A defect inspection method performed with a defect inspection apparatus, the defect inspection apparatus adapted to irradiate a first sample with illumination light to acquire a first sample optical image, and compare the first sample optical image to a reference image to inspect a defect of a mask used in a semiconductor manufacturing process, the defect inspection method comprising:
generating the reference image based on data of the mask;
acquiring the first sample optical image;
setting a defect detection condition using an index based on a result of defect inspection of a second sample different from the first sample; and
discriminating a nuisance from a result of comparison between the reference image and the first sample optical image based on the defect detection condition.

2. The defect inspection method according to claim 1, wherein the reference image is generated based on design data of the mask used for the first sample.

3. The defect inspection method according to claim 1, wherein the reference image is generated for a region different from a region for which the first sample optical image is acquired but having a same pattern of the mask used for the first sample.

4. The defect inspection method according to claim 1, wherein the index is prepared based on the result of the defect inspection of the second sample and a prediction of yields which is based on design data for the first sample.

5. The defect inspection method according to claim 4, wherein the result of the defect inspection of the second sample comprises sensitivity information indicative of detection sensitivity for the nuisance.

6. The defect inspection method according to claim 1, wherein the defect inspection of the second sample uses a defect detection condition set based on design data for the first sample.

7. The defect inspection method according to claim 1, wherein the index is set based on the result of the defect inspection of the second sample and information on manufacturing capability for a product which is based on the second sample, wherein the information on the manufacturing capability for the product comprises information on defect inspection, a review result for the product, and yield information of the product.

8. The defect inspection method according to claim 1, wherein the setting the defect detection condition comprises:
   conducting defect detection of a third sample different from the first sample and the second sample; and
   predicting yields based on a result of the defect inspection of the third sample.

9. The defect inspection method according to claim 1, wherein the defect detection condition comprises multiple elements including defect categorization, defect grouping, defect detection sensitivity, and nuisance filtering.

10. The defect inspection method according to claim 9, wherein the multiple elements are selected and/or excluded based on the index.

11. The defect inspection method according to claim 9, wherein the defect detection sensitivity is set based on the index.

12. The defect inspection method according to claim 1, further comprising setting an optical-system condition based on design data for the first sample.

\* \* \* \* \*